United States Patent [19]

Juhl et al.

[11] Patent Number: 4,714,736

[45] Date of Patent: Dec. 22, 1987

[54] STABLE POLYAMIDE SOLUTIONS

[75] Inventors: Roger L. Juhl; James L. Potter; Sotiros C. Polemenakos, all of Lake Jackson, Tex.

[73] Assignee: The Dow Chemical Company, Midland, Mich.

[21] Appl. No.: 869,152

[22] Filed: May 29, 1986

[51] Int. Cl.$^4$ .......................... C08J 3/06; C08L 77/06; C08G 69/46

[52] U.S. Cl. ..................................... 524/608; 524/845

[58] Field of Search ................................. 524/845, 608

[56] References Cited

U.S. PATENT DOCUMENTS

| | | |
|---|---|---|
| 2,374,576 | 4/1924 | Brubaker . |
| 2,489,569 | 11/1949 | Foulds et al. . |
| 2,610,927 | 9/1952 | Foulds . |
| 2,926,116 | 2/1960 | Keim . |
| 2,926,154 | 2/1960 | Keim . |
| 3,039,889 | 6/1962 | Keim . |
| 3,197,427 | 7/1965 | Schmalz . |
| 3,215,654 | 11/1965 | Schmalz . |
| 3,224,986 | 12/1965 | Butler et al. . |
| 3,227,671 | 1/1966 | Keim . |
| 3,228,898 | 1/1966 | Illing et al. . |
| 3,239,491 | 3/1966 | Tsou et al. . |
| 3,240,761 | 3/1966 | Keim . |
| 3,259,600 | 7/1966 | Coscia et al. . |
| 3,269,970 | 8/1966 | Epstein et al. . |
| 3,311,594 | 3/1967 | Earle, Jr. . |
| 3,332,901 | 7/1967 | Keim . |
| 3,536,647 | 10/1970 | Battista . |
| 3,584,072 | 6/1971 | Winslow . |
| 3,607,622 | 9/1971 | Espy . |
| 3,609,126 | 9/1971 | Asao et al. . |
| 3,632,559 | 1/1972 | Basel et al. . |
| 3,763,113 | 10/1973 | Burrows et al. . |
| 3,804,791 | 4/1974 | Morgan . |
| 3,836,498 | 9/1974 | Gulrich et al. . |
| 3,891,589 | 6/1975 | Ray et al. . |
| 3,914,155 | 10/1975 | Horowitz . |
| 4,450,045 | 5/1984 | Hertel et al. . |

Primary Examiner—C. Warren Ivy
Attorney, Agent, or Firm—K. M. Tackett

[57] ABSTRACT

Polyamide solutions for imparting wet strength to paper are stabilized by acidifying uncrosslinked polyamide solutions prior to storage or prior to crosslinking with epichlorohydrin to form polyamide resins. The acidification of the uncrosslinked solutions allows for storage without refrigeration. The acidification prior to crosslinking results in wet strength resins that are stable at solids concentrations of at least 30% and that exhibit high strength when the resins are post cooked to a viscosity of between about 325 and 425 cps.

3 Claims, No Drawings

STABLE POLYAMIDE SOLUTIONS

SPECIFICATION

1. Field of the Invention

The invention relates to the manufacture of polyamide solutions which are used to impart wet strength to paper. Specifically, the invention relates to such polyamide solutions that are more stable than known polyamide solutions.

2. Background of the Invention

Aqueous polyamide solutions that are prepared by the reaction of a polyalkylene polyamine with a saturated aliphatic dicarboxylic acid having from 3 to 10 carbon atoms are used primarily in paper manufacturing to increase the wet strength of paper. The polyamide solutions are crosslinked with a crosslinking agent such as epichlorohydrin before the polyamides are introduced into the paper manufacturing process.

The polyamide solutions are typically prepared by chemical manufacturers and shipped to end users such as paper manufacturers. Current practice involves the shipment of either refrigerated uncrosslinked polyamide solutions or unrefrigerated crosslinked polyamide solutions. Refrigeration of the uncrosslinked polyamide solution is required to provide stability and is economical only because the refrigerated uncrosslinked polyamide solutions are stable at a much higher concentration of the polyamide than the unrefrigerated crosslinked polyamide solutions.

Uncrosslinked polyamide solutions are typically transported as alkaline solutions having a pH greater than about 10 and polyamide concentrations of from about 30 to about 60 percent by weight. When uncrosslinked polyamide solutions are crosslinked with epichlorohydrin before transportation to end users, the crosslinking is performed in alkaline solution having a pH range of from about 10 to about 12. The crosslinked polyamide solutions are transported with a solids content of about 12 to 20 percent and do not require refrigeration when acidified to reduce the pH to at least about 3.

SUMMARY OF THE INVENTION

The present invention includes the discovery that acidification of uncrosslinked polyamide solutions that are prepared by the reaction of a polyalkylene polyamine with a saturated aliphatic dicarboxylic acid having from about 3 to 10 carbon atoms sufficiently improves the stability of the polyamide solution to eliminate the need for refrigeration during transportation to users. The amount of acidification required is directly related to the polyamide concentration of the uncrosslinked polyamide solution and generally must be below a pH of about 9, preferably a pH range from about 5 to about 7.

The invention further includes the discovery that a stable, high strength polyamide resin can be prepared by reacting an uncrosslinked polyamide with a crosslinking agent in an alkaline solution, having a pH below about 8, and post cooking the resin to a viscosity between about 325 and 425 cps, preferably to about 400 cps. The stable, crosslinked polyamide solutions can be transported in aqueous solutions having a solids content of at least about 30 percent when the solutions are acidified to a pH below about 6.

DETAILED DESCRIPTION OF THE INVENTION

The uncrosslinked polyamide solutions used in the present invention are generally prepared by reacting a polyalkylene polyamine, preferably diethylenetriamine, with a saturated aliphatic dicarboxylic acid having from 3 to 10 carbon atoms, preferably adipic acid, using a ratio of the dicarboxylic acid to the polyalkylene polyamine of from about 0.8:1 to about 1.4:1. Such reactions are well known in the art.

The following data and examples illustrate the preparation and effectiveness of the stable uncrosslinked and crosslinked polyamide solutions of the present invention. The examples are illustrative and explanatory, and are not intended to limit the invention.

EXAMPLE I

A base uncrosslinked polyamide solution was prepared by adding 327 grams of adipic acid, 108 grams of water, and 225 grams of diethylenetriamine to a 1-liter resin kettle equipped with a mechanical stirrer, a Barret trap, and a heating mantel. The reaction mixture was rapidly heated to about 165° C. until all water, 188.7 grams, was removed. The mixture was then cooled and 470 grams of water was added to form an aqueous solution having a concentration of about 50 percent by weight of adipic acid/diethylenetriamine polyamide resin, a viscosity of about 370 cps, and a pH of about 10.5.

Sulphuric acid was added to a portion of the aqueous polyamide resin until the pH of the resin was reduced to 7.0. The acidified aqueous resin had a shelf life without refrigeration (i.e. at ambient temperature) in excess of 53 days without signs of solids formation.

EXAMPLE II (COMPARISON)

A portion of the base aqueous polyamide resin from Example I was stored without acidification and had a shelf life of only 3 days before showing signs of solids formation.

EXAMPLE III

Additional portions of the base polyamide solution were acidified and tested for shelf life, as indicated in Table I, using the procedure of Examples I and II.

TABLE I

| Acid | pH | Days Stable | Remarks |
|---|---|---|---|
| $H_2SO_4$ | 8.5 | 17 | |
| $H_2SO_4$ | 8.5 | 25 | |
| $H_2SO_4$ | 7.0 | >53 | Example I |
| $H_2SO_4$ | 5.0 | >53 | |
| HCl | 8.5 | 13 | Resin Discolored |
| HCl | 8.5 | 7 | Resin Discolored |
| HCl | 7.0 | >53 | Resin Discolored |
| $H_3PO_4$ | 8.5 | 6 | |
| $H_3PO_4$ | 5.5 | >53 | |
| $HCO_2H$ | 7.0 | 5 | Resin Discolored |
| $HCO_2H$ | 5.0 | >53 | Resin Discolored |
| CONTROL | 10.5 | 3 | Example II |

The acidified, uncrosslinked polyamide solution demonstrated increased stabilizing in comparison to the unacidified solution. The longer shelf life of the acidified solution allows transportation without refrigeration, and thus greatly reduces the cost of transportation in comparison to the unacidified solution.

EXAMPLE IV

A 100 gram portion of the base polyamide of Example I was mixed with 395 grams of water in a 1-liter resin kettle and heated to 50° C. Sulphuric acid was then added to reduce the pH of the polyamide solution to about 7. Epichlorohydrin was then added drop wise for about 30 minutes until 25.5 grams were added. The solution was then heated to 70° C. and stirring continued for about 2 hours and 10 minutes until the crosslinked polyamide solution attained a viscosity of 660 cps. The same procedure was repeated to produce three additional samples of resin having viscosities of 155, 410, and 435 cps. Formic acid was added to each of the samples to reduce the pH to 3.5 and then sulfuric acid was added to each of the samples to further reduce the pH to 2.5.

Each of the resin samples were used to prepare a handsheet for testing the wet strengths of the resin according to the test procedures described in TAPPI Standards T-200 and T-205. The handsheets were prepared using a 1½ inch pound British handsheet machine, a Standard press capable of holding 50 psi pressures, and a Mullin's Burst tester.

Equal 180 gram portions of hardwood and softwood pulp were disintegrated in water until a pulp concentration of 1.5 percent was obtained. This slurry was then divided into 1-liter portions for preparation of the wet strength resin samples.

Each wet strength resin solution was diluted to 1 percent solids concentration and a 13 milliliter portion was then added to one of the 1-liter portions of the 1.5 percent pulp slurry. The amount of resin used per pulp slurry correlates to 20 pounds of resin per ton of paper. After adding the resin, the pH of the pulp slurry was adjusted to between 7 and 8 and stirring was continued for 5 minutes.

The samples of pulp slurry containing the resin samples were diluted to make 0.125 percent pulp slurry samples from which 1,100 millimeter portions were added to the head box of the British handsheet machine. The handsheet machine produced handsheets having diameters of about 6.5 inches and weighing about 1.30 grams which corresponds to about 37 lbs per ream (one ream equals 3,000 square feet).

Excess water was removed from each handsheet with blotter paper after removal from the handsheet machine and the handsheets were oven dried for 30 minutes at 85° C. to cure the resin and to dry the paper handsheet. Each handsheet was then cut in half and one-half measured for wet strength and the other half measured for dry strength using the Mullin's Burst tester. Results are shown in Table II

TABLE II

| Resin Viscosity, cps | Wet Strength, psi | Dry Strength, psi |
| --- | --- | --- |
| 155 cps | 12.0 psi | 46 psi |
| 410 cps | 16.2 psi | 55 psi |
| 435 cps | 13.3 psi | 48 psi |
| 660 cps | 12.9 psi | 49 psi |

EXAMPLE V

A test handsheet was prepared using POLYCUP 172,[1] a commercially available wet strength resin, following the procedures described in Example IV. This resin had a viscosity of 50 cps and the handsheet prepared from the resin was measured for wet strength and dry strength as described in Example IV. The wet strength of the handsheet prepared from the POLYCUP 172 was determined to be 16.6 psi and the dry strength was determined to be 54 psi.

[1]POLYCUP 172 is a trademark of the Hercules Powder Company for a crosslinked polyamide resin.

In comparison to the POLYCUP 172, the crosslinked polyamide solutions of the present invention exhibited similar wet strength at a viscosity of about 400 cps. For a resin velocity between about 325 cps and 425 cps, the crosslinked polyamide resin solutions of the present invention exhibited wet strengths of at least about 90 percent of the wet strength of the POLYCUP 172 although the wet strength was found to be dependent on initial viscosity. The various samples in Example IV were not tested for stability prior to handsheet preparation and Example VI was specifically conducted to determine the stability of the crosslinked polyamide resins of the present invention.

EXAMPLE VI

A base uncrosslinked polyamide solution was prepared by adding 327 grams adipic acid, 108 grams of water, and 227 grams of diethylenetriamine to a 2-liter resin kettle equipped with a mechanical stirrer, a Dean Stark trap, and a heating mantel. The reaction mixture was heated while water was being removed for approximately 3 hours until all water was removed. The mixture was then cooled and 475 grams of water were added to form an aqueous solution having a concentration of about 50 percent by weight of adipic acid/diethylenetriamine polyamide resin.

To 300 grams of the base unacidified, uncrosslinked polyamide solution were added with mixing 214 grams of water and 91 grams of 6.25 normal hydrochloric acid to reduce the pH to 7.0. Epichlorohydrin was added to this mixture over a period of several hours at 25° to 35° C. until 76.5 grams of epichlorohydrin were added. The addition of epichlorohydrin was followed by post cooking at 60° C. until the resulting crosslinked resin obtained a viscosity of about 375 cps as measured by a Brookfield viscometer. The crosslinked resin was then acidified to a pH of 5.0 with sulfuric acid and allowed to sit overnight. The following day, the acidified crosslinked resin was reacidified with formic acid to a pH of 4.5. The final resin was stored for two weeks without any apparent increase in viscosity and then was subjected to accelerated aging for two days at 50° C., to simulate a month at room temperature, again without any increase in viscosity.

The stability of the crosslinked polyamide solution prepared under non-alkaline conditions apparently results from a shift in the predominate specie formed by the reaction of the epichlorohydrin with the nitrogen atoms of the adipic acid/diethylenetriamine polyamide resin. Under alkaline conditions, the reaction of epichlorohydrin with the polyamide base polymer forms the oxirane specie shown below;

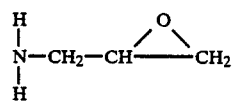

Under non-alkaline conditions, the chlorohydrin specie is preferred and is shown below:

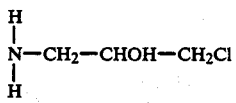

The chlorohydrin specie formed under non-alkaline conditions is apparently less reactive and thus more stable than the oxirane specie formed under alkaline conditions.

A third specie of the reaction of epichlorohydrin with the polyamide base polymer is the azetidinium specie shown below;

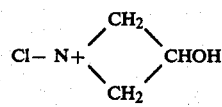

and is formed (along with the oxirane specie) from the chlorohydrin specie when the pH is raised. The azetidinium specie is more reactive and less stable than the oxirane specie and considerably more reactive than the chlorohydrin specie.

What is claimed is:

1. A method for storing an uncrosslinked polyamide solution, comprising the steps of:
   reacting an aqueous polyalkylene polyamine with a saturated aliphatic dicarboxylic acid having from 3 to 10 carbon atoms to prepare an uncrosslinked polyamide;
   diluting the polyamide with water to form an aqueous polyamide solution having a concentration of polyamide of from about 30% to about 60% by weight;
   acidifying the aqueous polyamide solution with sufficient acid to reduce the pH of the solution to below about 9; and
   storing the acidified uncrosslinked solution at ambient temperature for more than three days.

2. The method of claim 1, wherein the step of acidifying the solution reduces the pH to a range of from about 5 to about 7.

3. The method of claim 1, wherein the uncrosslinked polyamide is prepared by reacting diethylenetriamine with adipic acid.

* * * * *